United States Patent
Oshima

(10) Patent No.: US 7,215,435 B2
(45) Date of Patent: May 8, 2007

(54) IN-NET PRINTING SYSTEM AND METHOD OF IN-NET PRINTING

(75) Inventor: Akihide Oshima, Tokyo (JP)

(73) Assignee: NEC Corporation, Tokyo (JP)

( * ) Notice: Subject to any disclaimer, the term of this patent is extended or adjusted under 35 U.S.C. 154(b) by 835 days.

(21) Appl. No.: 10/025,471

(22) Filed: Dec. 26, 2001

(65) Prior Publication Data
US 2002/0080403 A1 Jun. 27, 2002

(30) Foreign Application Priority Data
Dec. 22, 2000 (JP) ............... 2000-389990

(51) Int. Cl.
G06K 15/00 (2006.01)
G06F 3/12 (2006.01)
(52) U.S. Cl. ..................... 358/1.15; 358/402
(58) Field of Classification Search ............. 358/1.15, 358/402, 403, 407, 442; 379/100.01, 100.06; 455/426.2, 73; 709/206
See application file for complete search history.

(56) References Cited

U.S. PATENT DOCUMENTS 6,553,240 B1 * 4/2003 Dervarics ................. 455/566
6,654,601 B2 * 11/2003 Picoult et al. ............ 455/412.1
6,738,841 B1 * 5/2004 Wolff ......................... 710/62
6,799,297 B2 * 9/2004 Ackaret .................... 715/505
6,922,258 B2 * 7/2005 Pineau ..................... 358/1.15
6,947,995 B2 * 9/2005 Chang et al. .............. 709/231
6,970,263 B2 * 11/2005 Suzuki et al. ............. 358/1.15
7,006,242 B2 * 2/2006 Smith et al. ............... 358/1.15

FOREIGN PATENT DOCUMENTS

| JP | 10 49607 | 2/1998 |
| JP | 10 207657 | 8/1998 |
| JP | 11-146118 | 5/1999 |
| JP | 11-184777 | 7/1999 |

* cited by examiner

Primary Examiner—Gabriel I. Garcia
(74) Attorney, Agent, or Firm—Young & Thompson

(57) ABSTRACT

An in-net printing system includes a portable terminal, a printer system and a network server system. The portable terminal, the printer system and the network server are connected to a network. In the in-net printing system, the portable terminal obtains a read data from the network server system and outputs a print request to the printer system in order to print the read data. The printer system outputs a transfer request to the network server system in response to the print request. The network server system outputs the read data to the printer system, based on the transfer request. The printer system prints the read data, when receiving the read data.

15 Claims, 3 Drawing Sheets

IN-NET PRINTING SYSTEM AND METHOD OF IN-NET PRINTING

BACKGROUND OF THE INVENTION

1. Field of the Invention

The present invention relates to an in-net printing system and a method of an in-net printing. More particularly, the present invention relates to an in-net printing system for outputting data on a network to a printer, and a method of a charging type in-net printing.

2. Description of the Related Art

A technique is well known for printing data on a network onto an indicated network printer. It is the technique in which the network printer shared by a plurality of computers receives a printing job from one of the computers and then prints it. The Internet is known as the network. The data on the Internet is outputted and printed by the printer in accordance with an instruction from the computer.

Japanese Laid Open Patent Application (JP-A-Heisei 10-207657) discloses a technique of a network correspondence printer, a network correspondence printing system and a network printing system. The network printing system according to this technique includes a host computer and a printer. The host computer indicates the particular data of a data resource accumulated in a server on the network. The printer is connected to the data resource of the particular data indicated by the host computer, and it receives and prints the data resource. The feature thereof lies in the configuration including a print controller, a particular data register, a network controller, a data judging unit, a network retrieving unit, a conversion requesting unit and a data returning unit.

Here, the printer instructs a printing operation by controlling a print engine on the basis of an input data. The particular data register registers the particular data of the data resource indicated by the host computer. The network controller is connected through a network connecting unit to the registered data resource, and it receives the data resource. The data judging unit judges whether or not the received data resource is composed of a data that can be printed by the print controller. If the data judging unit judges that it is not the printable data, the network retrieving unit retrieves a conversion program for converting the received data resource into the printable data, through the network connecting unit. The conversion requesting unit transfers the received data resource to a converter having the retrieved conversion program, and the converter converts the received data resource into the printable data. The data returning unit returns the printable data converted by the converter, to the print controller.

In this system, without receiving all the instructions from the computer, the printer actively prints the data on the Internet. In such known printing system, the printer retrieves the print conversion program, participates in the printing operation positively and actively, and needs a high computer function.

Japanese Laid Open Patent Application (JP-A-Heisei 10-49607) discloses a technique of an ordering/receiving management system. The ordering/receiving management system according to this technique has an ordering terminal unit and a receiving terminal unit. The ordering terminal unit contains a touch type input unit, a display, a memory and a transmitter. Here, the touch type input unit inputs the data such as a name of an article, a number, a unit, an order source and the like. The display displays at least a part of the input data. The memory stores the data. The transmitter transmits the data through a public line to the receiving terminal unit. The transmitter further has an AND circuit for allowing the transmission of the input data only if the name of the article, the number and the unit are inputted.

The enlargement of a usage range in a portable terminal has been advanced. As an example of the enlargement of the usage range, it is requested that a portable terminal instructs a printer to output the data read on a network by using the portable terminal to a printer and print it. The portable terminal does not have a mechanical function that is physically large such as a printing function. Thus, the portable terminal instructs the printer to execute the printing operation. When the portable terminal is assembled onto a network to then establish a system for instructing the printer to print the data on the network, it is required to provide a further conventional service to a user.

It is required to improve the service of the system for instructing the printer to print the data on the network from the portable terminal having no physically large device. Moreover, it is required to provide the service without any burden on the printer. In such service, the improvement of the service is desired from the viewpoint of an charging system.

SUMMARY OF THE INVENTION

Therefore, an object of the present invention is to provide an in-net printing system that can improve the service of the system for instructing a printer to print the data on a network from a portable terminal, and a method of a charging type in-net printing.

Another object of the present invention is to provide an in-net printing system that can provide the service without any burden on a printer, and a method of a charging type in-net printing.

Still another object of the present invention is to provide an in-net printing system that can improve an charging service in the system, and a method of a charging type in-net printing.

In order to achieve an aspect of the present invention, the present invention provides an in-net printing system including a portable terminal, a printer system, and a network server system. The portable terminal, the printer system and the network server system are connected to a network. In this system, the portable terminal obtains a read data from the network server system and outputs a print request to the printer system to print the read data. The printer system outputs a transfer request to the network server system in response to the print request. The network server system outputs the read data to the printer system, based on the transfer request. The printer system prints the read data, when receiving the read data.

In order to achieve another aspect of the present invention, the present invention provides a method of a charging type in-net printing, including the steps of: (a) obtaining a read data by a portable terminal from a network server system connected to a network; (b) outputting a order command data showing a request for printing the read data from the portable terminal to a printer system; (c) obtaining a printable data, that the read data is converted by the network server system for the printer system, from the network server system, based on the order command data; and (d) printing the printable data by the printer system.

In the method of a charging type in-net printing, the portable terminal connects to the network by a wireless communication.

In the method of a charging type in-net printing, the portable terminal communicates with the printer system by a wireless communication. The wireless communication is unnecessary to admit.

In the method of a charging type in-net printing, the (c) obtaining step includes the steps of: (e) outputting a transfer command data showing a request for sending the read data from the printer system to the network server system, based on the order command data; (f) converting the read data into the printable data by the network server system, based on the transfer command data; and (g) outputting the printable data from the network server system to the printer system.

In the method of a charging type in-net printing, the order command data includes an address data. The address data shows an address of the read data.

In the method of a charging type in-net printing, the transfer command data includes the address data and a printer ID data. The printer ID data shows an address of the printer system and languages usable for the printer system.

In the method of a charging type in-net printing, the (b) outputting step includes the step of: (i) outputting a charging data used for a charge to the portable terminal by the network server system and the address data to the network server system. The order command data and the transfer command data further include the charging data. The network server system charges to the portable terminal for the support of obtaining said printable data.

In order to achieve still another aspect of the present invention, the present invention provides a portable terminal including a portable terminal body, a display section, a key section and non-admitted wireless section. The portable terminal body is connected to a network by a wireless communication and obtains read data from a network server system in the network. The display section displays the read data. The key section inputs a print command data showing a request for printing the read data. The non-admitted wireless section transfers the print command data and an address data showing an address of the read data to a printer system.

In the portable terminal, the non-admitted wireless section communicates with the printer system by a wireless communication. The wireless communication is unnecessary to admit.

In the portable terminal, the non-admitted wireless section further transfers a charging data used for charging for connection with the network server system.

In order to achieve yet still another aspect of the present invention, the present invention provides a printer system including a non-admitted wireless section, a network connection section and a printer apparatus body. The non-admitted wireless section receives an order command data, which shows a request for printing read data obtained from a network server system. The network connection section is connected to the network server system, transfers a transfer command data showing a request for sending a printable data that the print data is converted by the network server system and receives the printable data, based on the order command data. The printer apparatus body prints the printable data.

In the printer system, the order command data is transferred by a wireless communication. The order command data includes a print command data and an address data. The address data shows an address of the read data. The wireless communication is unnecessary to admit.

In the printer system, the transfer command data includes the address data and a printer ID data. The printer ID data shows an address of the printer system and languages usable for the printer system.

In the printer system, the order command data and the transfer command data further includes a charging data used for charging for connection with the network server system.

In order to achieve other aspect of the present invention, the present invention provides a network server system including a network server and a print data conversion server. The network server provides read data. The print data conversion server receives an address data showing an address of the read data and a printer ID data that shows an address of a printer system and a languages usable for the printer system, form the printer system. The print data conversion server obtains the read data from the network server based on the address data, converts the read data into a printable data and outputs the printable data to the printer system. In the printer system, the print data conversion server further receives a charging data used for charging for connection with said network server system.

DESCRIPTION OF THE PREFERRED EMBODIMENTS

Embodiment of an in-net printing system, a method of a charging type in-net printing, a portable terminal, a printer system and network server system according to the present invention will be described below with reference to the attached drawings.

Figure 1:
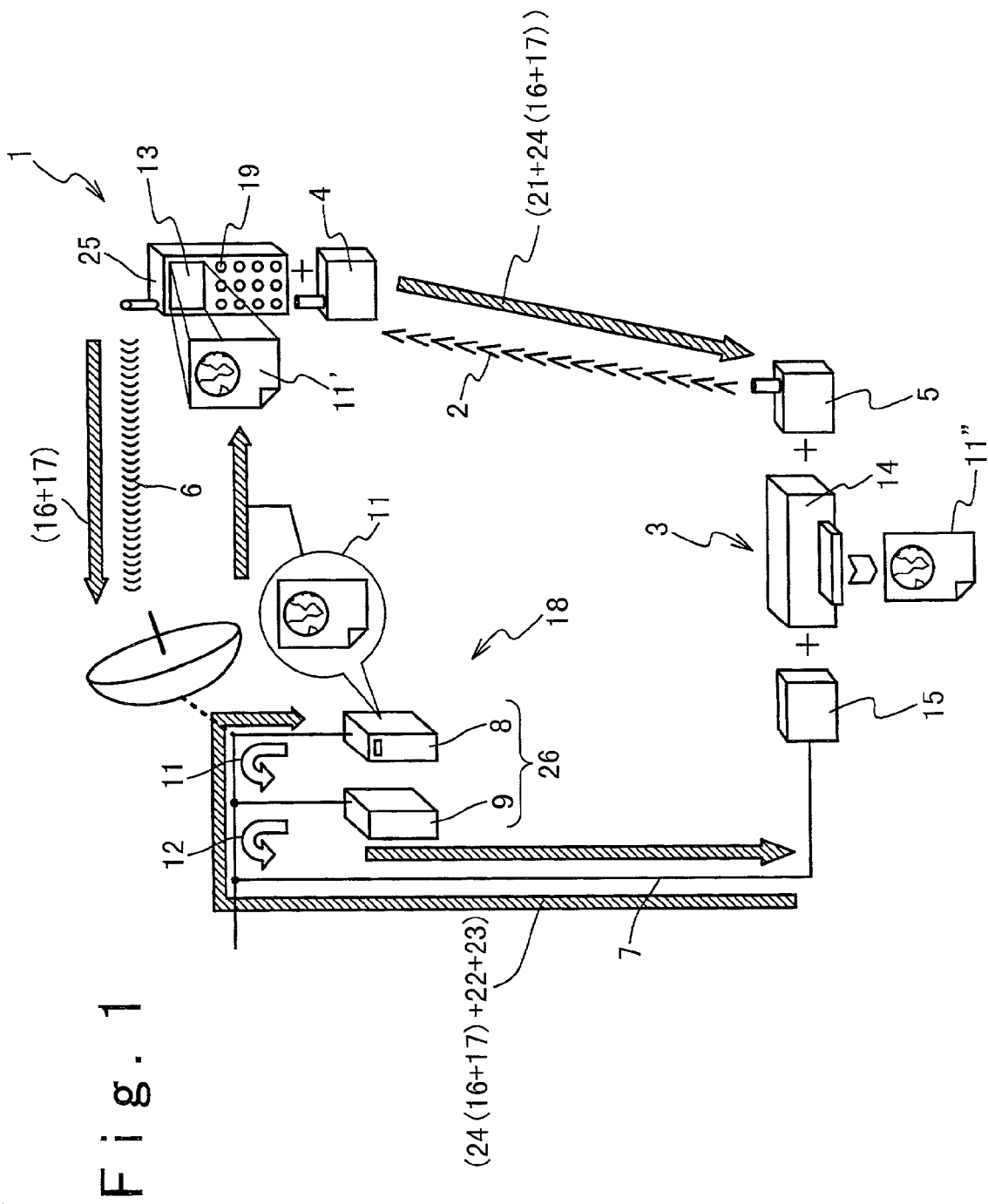
FIG. 1 is a system block diagram showing an embodiment of an in-net printing system according to the present invention.

Correspondingly to FIG. 1, in the embodiment of the in-net printing system, a portable terminal, a printer system and network server system according to the present invention, a portable terminal 1 is installed together with a printer system 3 that can be connected thereto.

The portable terminal 1 includes a display section 13, a key section 19, non-admitted wireless section 4 and a portable terminal body 25. The printer system 3 includes a non-admitted wireless section 5, a network connection section 15 and a printer apparatus body 14.

The portable terminal 1 is connected through a non-admitted wireless line 2 to a printer system 3, as shown in FIG. 1. The non-admitted wireless line 2 is unnecessary to be admitted to use. The portable terminal 1 has a non-admitted wireless section 4 on the terminal side to be connected to the printer system 3 through the non-admitted wireless line 2. The printer system 3 has a non-admitted wireless section 5 on the printer side to be connected to the printer system 3 through the non-admitted wireless line 2. The portable terminal 1 can be connected to the printer system 3 wirelessly and locally by using the non-admitted wireless line 2.

The portable terminal 1 (of the portable terminal body 25) is connected through a public subscriber wireless line 6 to a public wire network 7. The public wire network 7 has a network server 8 and a print data conversion server 9. The network server 8 stores a read data (contents) 11, and allows a user, who is a subscriber, to read it. The read data 11 has an address (Exemplification: http//www.aaa.com).

The print data conversion server 9 has a converting function of converting the read data 11 into a printable data 12 that can be printed by the printer system 3. The portable terminal 1 has a display section 13. The display section 13 obtains the read data 11 of the network server 8 through the public subscriber wireless line 6, and displays the read data 11 as a read data 11'.

The printer system 3 has a printer apparatus body 14 and a network connection section 15. The network connection section 15 is connected to the public wire network 7, and it can obtain an information data on the public network through the network server 8. The one of the information data obtained by the network connection section 15 is the printable data 12 after the print data conversion server 9 converts the read data 11. The printer apparatus body 14 outputs a print picture 11" as a printed matter based on the printable data 12.

Figure 2:
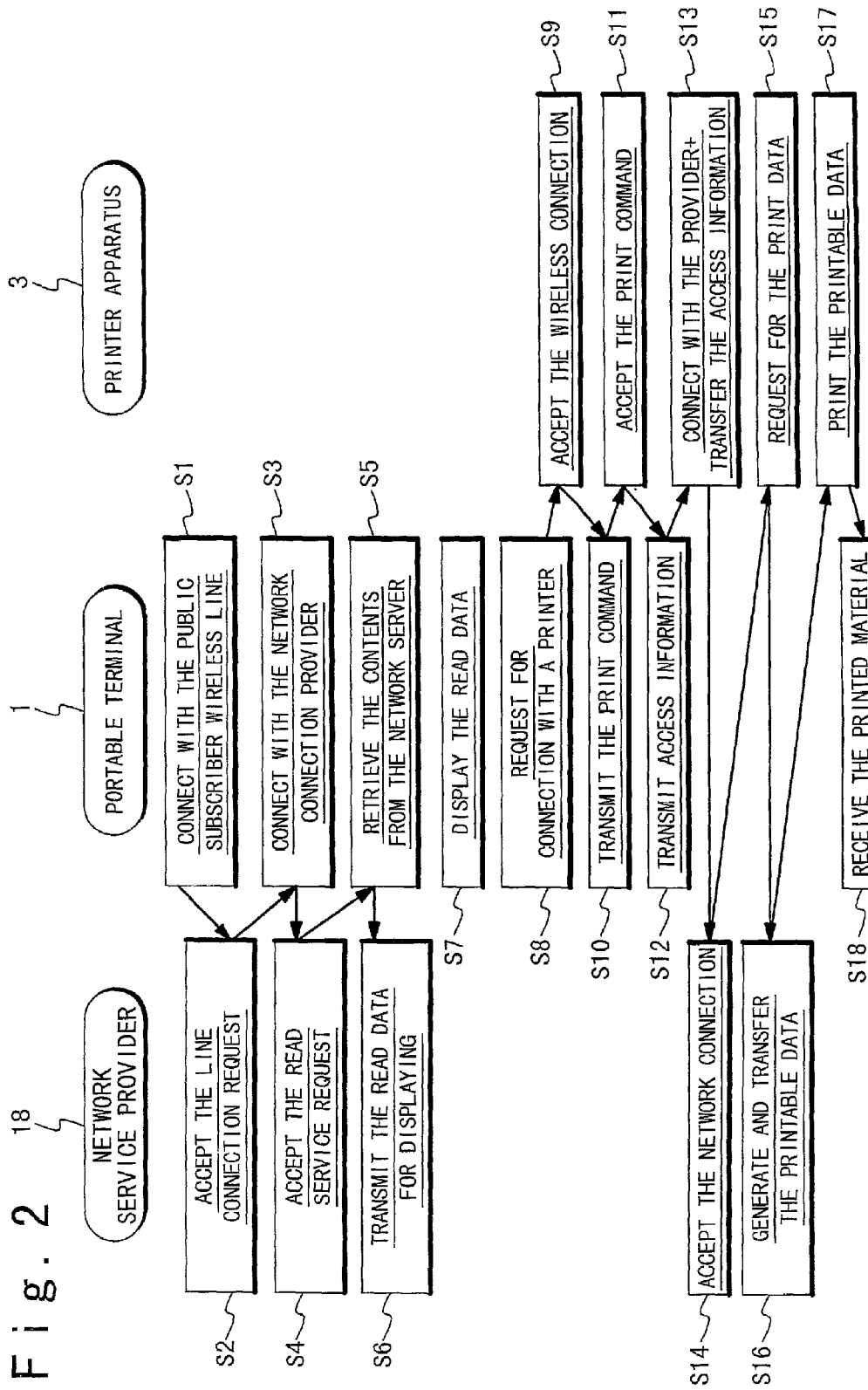
FIG. 2 is an operational flowchart showing an embodiment of a method of a charging type in-net printing according to the present invention.

FIG. 2 shows an embodiment of a method of a charging type in-net printing according to the present invention. A portable terminal user connects the portable terminal 1 to the public subscriber wireless line 6 holding a contract in advance, by using a contractor ID/password 16 (Step S1). After establishing the connection, the user requests a line connection to the network server 8 having a desirable information on the public wire network 7 by using an address data 17 such as URL.

When a network connection provider 18 (including a network server system 25 which includes the network server 8 and the print data conversion server 9) receives the request for the line connection from the user (the portable terminal 1), it (18) accepts the request (Step S2). The network connection provider 18 establishes a network provider connection between the network connection provider 18 and the portable terminal 1 (Step S3). The network connection provider 18 receives and accepts read service requests from the portable terminal 1 (Step S4). The portable terminal 1 retrieves desirable contents from the network server 8 (Step S5). The portable terminal 1 requests the transmission of the read data 11 that is the desirable contents found out by the retrieval.

In accordance with the request from the portable terminal 1, the network server 8 transmits the read data 11 through the public subscriber wireless line 6 to the portable terminal 1 (Step S6). The read data 11 is displayed on the display section 13 of the portable terminal 1 as the read data 11' (Step S7). Thus, the portable terminal user can recognize the read data 11 as the read data 11'.

The portable terminal user executes a print command data 21 by inputting it at a key section 19 of the portable terminal 1, when carrying out a process for printing the read data 11 by using the printer system 3. Based on the execution of the print command data 21, the non-admitted wireless section 4 of the portable terminal 1 requests the non-admitted wireless section 5 of the printer system 3 to establish a non-admitted wireless connection (Step S8). The non-admitted wireless section 5 of the printer system 3 accepts and executes the non-admitted wireless connection in accordance with the request, and it is connected to the non-admitted wireless section 4 (Step S9).

If the non-admitted wireless connection is established as mentioned above, the print command data 21 in the portable terminal 1 is transmitted to the printer system 3 (Step S10). The printer system 3 receives and accepts the print command data 21 (Step S11). The portable terminal 1 transmits the print command data 21 together with the access data 24 (composed of the contractor ID/password 16 and the address data 17) from the non-admitted wireless section 4 through the non-admitted wireless line 2 to the non-admitted wireless section 5 (Step S12).

From Step S10 to Step S12, the portable terminal 1 transmits an order command data (composed of the print command data 21, the contractor ID/password 16 and the address data 17) to the printer system 3.

At the same time, the portable terminal 1 transmits the access data 24 (the contractor ID/password 16 and the address data 17) to the network server 8.

The printer system 3 transfers a printer ID data 22, recognized as the printer system 3, together with the access data 24 to the network connection provider 18. The printer ID data that shows an address of said printer system and languages usable for said printer system. These two kinds of data are transferred through a communication route via the public wire network 7 connected by the network connection section 15. The printer system 3 tries an access to the network connection provider 18 (Step S13). The network connection provider 18 receives and accepts the access from the printer system 3. Then, it is connected through the public wire network 7 to the printer system 3 (Step S14). The printer system 3 transmits a print data transfer request 23 to the network connection provider 18 (Step S15).

From Step S13 to Step S15, the printer system 3 transmits a transfer command data (composed of the print data transfer request 23, the printer ID data 22, the contractor ID/password 16 and the address data 17) to the network connection provider 18.

In the network connection provider 18, the print data conversion server 9 interprets the printer ID data 22. Then, the print data conversion server 9 gets the read data 11 from the network server 8 based on the address data 17. After that, the print data conversion server 9 converts the read data 11 corresponding to the address data 17 into the printable data 12. The printable data 12 is generated and transferred through the public wire network 7 to the printer system 3 (Step S16). The printer apparatus body 14 of the printer system 3 outputs (prints) the read data 11" as the printed material in accordance with the thus-transferred printable data 12 (Step S17). The portable terminal user obtains the material (Step S18).

Figure 3:
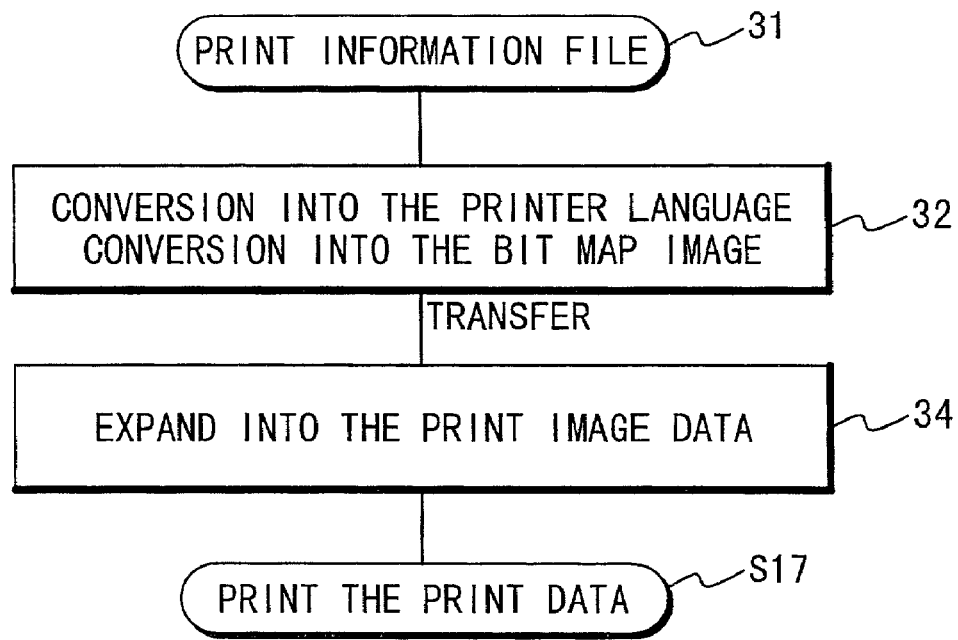
FIG. 3 is an operational flowchart showing a part of the operational flow of FIG. 2 in detail.

The print data conversion server 9 has a print information file 31 shown in FIG. 3. The print information file 31 has file formats based on various application specifications, and further has various picture formats. The print data conversion server 9 has data conversion function into the bit map image and data conversion function into the printer language corresponding to various printers, with regard to the read data 11. That is, the print data conversion server 9 has a print language function 32 for converting the read data 11 into a printable language and then generating the printable data 12.

It is not necessary for the user of the portable terminal 1 to own the printer system 3. It is one of the embodiments that the network connection provider 18 or other trader owns the printer system 3 somewhere such as shops, convenience stores, stations, airports and so on.

Figure 4:
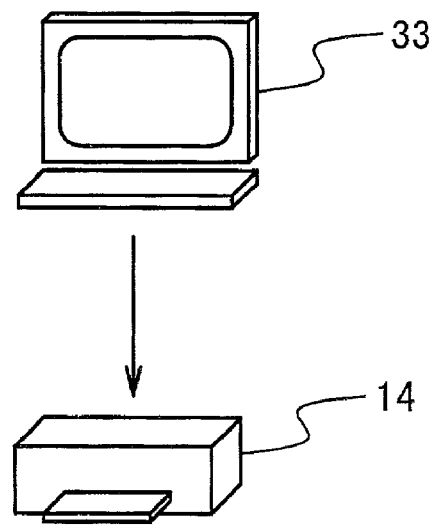
FIG. 4 is an oblique projection view showing a printer.

The printer system 3 has a personal computer 33 shown in FIG. 4. The personal computer 33 has an expanding function, as shown in FIG. 3. The personal computer 33 expands the printable data 12, converted by the print language function 32 of the print data conversion server 9, into a print image data. Then, the expanding function instructs the printer apparatus body 14 to carry out the Step S17 of FIG. 2.

The network connection provider 18 (or the network connection trader corresponding to the network connection provider 18) charges the fee to the user corresponding to the portable terminal 1, based on the access data 24. The fee is for the service provided by converting the read data 11 into the printable data 12 and/or transferring the printable data 12 (for the support of obtaining said printable data 12). The access data (composed of the contractor ID/password 16 and the address data 17) is the unique data unique to the read data 11.

That is, the portable terminal 1 transmits the address data 17 and the contractor ID/password 16 through the communication network (public subscriber wireless line 6) to the network connection provider 18, when the portable terminal 1 transmits the access data 24 to the printer system 3. The address data 17 is the unique data corresponding to the print target data. The contractor ID/password 16 is the charging data corresponding to the portable terminal 1. The simultaneous transmission of the charging data (the contractor ID/password 16) enables the data obtainment and the payment to be done at the same time, and thereby enables the charging operation to be simplified. The charging data (the contractor ID/password 16) is directly transmitted from the portable terminal 1 to the server of the network connection provider 18, and simultaneously jointly transmitted through the printer system 3 to the server of the network connection provider 18. The server of the network connection provider 18 confirms the agreement between the charging data (the contractor ID/password 16) transmitted from both the routes and then reserves the sureness of the information service. For this charging operation, it is possible to use only one of the charging data (the contractor ID/password 16) transmitted from both the routes.

Thus, if paying such a fee, the user can quickly obtain any information existing on the network through the printer system 3 by effectively using the portable terminal 1 having no physically printing function. It can be done through a quickly communicating network with regard to the information provided by the network connection provider 18. Also, the fee can be smoothly paid. In this way, the usage target range of the portable terminal 1 is spread.

The portable terminal having no substantially physical performance can serve as an instructing tower within the network, and use the large physical facilities within the network or connected to the network, and obtain the data (information), and then print out the data (information). The function of the printer system is not required on the portable terminal. The printer system, when receiving the unique data unique to the necessary data from the portable terminal, uses the self-unique data and the unique data to the print target data, and then obtain the print target data from the network. In this case, it is not necessary for the printer system to have the conversion function for the print language. Due to the usage of the quick net line, under the cheapest infrastructure, the necessary information can be obtained at a cost cheaper than that of the case of the usage of the public line.

The owner of the portable terminal can use the external, huge and physical system which is not possessed by the owner, and quickly retrieve the necessary information and also output it to the printer apparatus body 14 at a high speed. The printer system 3 does not have the converting function of converting the read data 11 (print target data) into the printable data 12, and the server representatively possesses such a conversion function. Thus, the burden on the load of the printer system 3 is reduced. Hence, the network connection trader can provide the high service through the portable terminal to the owner thereof.

The data retrieval and the printing service are integrated into the single element. The data provision service can be attained in the portable terminal. Also, the quality of the service is improved with regard to the high-speed property. Thus, it is possible to sufficiently use the physical facility having the high speed and the high performance, which is located at an external portion.

It is possible to retrieve the print target data (read data 11) printed from a number of print target data groups which are possessed by the network connection trader (network connection provider 18). Thus, this is further convenient. Since the communicating action and the retrieving action are carried out through the public wireless line, the service can be further improved.

The in-net printing system according to the present invention and the charging type of the in-net printing method can use the function and the information on the network having the physically large scale and the quick performance, and output to the printer from the portable terminal having no physical performance while reducing the burden on the printer. Also, both the services of the data provision and the printing provision can be integrally made into the high quality. Moreover, it is possible to unify the services including the charging operation into the single service.

What is claimed is:

1. An in-net printing system comprising:
    a portable terminal connected to a network;
    a printer system connected to said network; and
    a network server system connected to said network;
    wherein said portable terminal obtains a read data from said network server system and said portable terminal outputs
    i) a print request to said printer system to print said read data, the print request comprising an order command data composed of a print command data (21), an identification data for the portable terminal and an internet address data (17) where the read data is located, ii), when sending the printer request, transmits the identification data and password (16) and the internet address data (17) through said network to the network server system,
    said printer system outputs a transfer command data to said network server system in response to said print request, the transfer command data comprising a transfer request, the identification data and the internet address data,
    said network server system outputs said read data to said printer system, based on said transfer command data, when said network server system confirms an agreement between the identification data sent by said portable terminal and the identification data contained within the transfer command data sent by said printer system, and
    said printer system prints said read data, when receiving said read data.

2. The system of claim 1, wherein, a printing fee of said printer system is charged to a user corresponding to the portable terminal based on the order command data, when said network server system confirms the agreement between the identification data sent by said portable terminal and the identification data sent by said printer system.

3. A method of a charging type in-net printing, comprising the steps of:

(a) obtaining a read data by a portable terminal from a network server system connected to a network;

(b) outputting an order command data showing a request for printing said read data and composed of a print command data, an identification data for the portable terminal and an internet address data where the read data is located, from said portable terminal to a printer system;

(c) outputting a transfer command data from said printer system to said network server system in response to said order command data, the transfer command data comprising a transfer request, the identification data and the internet address data;

d) obtaining a printable data, wherein said read data is converted by said network server system for said printer system, outputted from said network server system when said network server system confirms an agreement between i) identification data for the portable terminal sent by said portable terminal and ii) the identification data sent by said printer system, based on said transfer command data; and (e) printing said printable data by said printer system.

4. The method of a charging type in-net printing according to claim 3 wherein said portable terminal connects to said network by a wireless communication.

5. The in-net printing system according to claim 4 wherein said portable terminal communicates with said printer system by a wireless communication which is unnecessary to be admitted.

6. The method of a charging type in-net printing according to claim 5, wherein said (d) obtaining step comprises the steps of:

(f) outputting the transfer command data from said printer system by said network server system, based on said order command data;

(g) converting said read data into said printable data by said network server system, based on said transfer command data; and (h) outputting said printable data from said network server system to said printer.

7. The method of a charging type in-net printing according to claim 6, wherein said transfer command data further includes a printer ID data which shows an address of said printer system and languages usable for said printer system.

8. The method of claim 3, wherein, a network connection provider (18) charges the printing fee to a user corresponding to the portable terminal, based on the identification data and the internet address data sent from the portable terminal to the network server system, in response to the confirmation of the agreement between said identification data sent by said portable terminal and the identification data sent by said printer system.

9. The method of claim 3, wherein, the printing fee is charged to a user corresponding to the portable terminal, the printing fee being based on the identification data and the internet address data sent from the portable terminal to the network server system, in response to the confirmation of the agreement between said identification data sent by said portable terminal and the identification data sent by said printer system.

10. The method of claim 3, wherein, a printing fee of said printer system is charged to a user corresponding to the portable terminal based on the order command data, in response to the confirmation of the agreement between the identification data sent by said portable terminal and the identification data sent by said printer system.

11. A printer system comprising:

a non-admitted wireless section which receives from a portable terminal, order command data that shows a request for printing read data obtained from a network server system located on the internet, the order command data comprising a print command data (21), an identification data, and an internet address data (17) where the read data is located;

a network connection section which is connected to said network server system, the network connection section transfers a transfer command data showing a request for sending a printable data and comprising a transfer request, the identification data and the internet address data, based on said order command data, and the network connection section receives said printable data, outputted from said network server system when said network server system confirms an agreement between the identification data sent by said portable terminal and the identification data sent by said printer system, based on said transfer command data, wherein, said print data is converted into said printable data by said network server system; and a printer apparatus body which prints said printable data.

12. The printer system according to claim 11 wherein said order command data is transferred by a wireless communication which is unnecessary to be admitted.

13. The printer system according to claim 12 wherein said transfer command data further includes a printer ID data showing an address of said printer system and languages usable for said printer system.

14. The printer system according to claim 13 wherein said order command data and said transfer command data further includes a charging data used for charging for connection with said network server system.

15. The system of claim 11, wherein, a printing fee of said printer system is charged to a user corresponding to the portable terminal based on the order command data, in response to the confirmation of the agreement between the identification data sent by said portable terminal and the identification data sent by said network connection section to said network server system.

* * * * *